United States Patent
Zheng et al.

(10) Patent No.: US 8,054,583 B2
(45) Date of Patent: Nov. 8, 2011

(54) TA/W FILM AS HEATING DEVICE FOR DYNAMIC FLY HEIGHT ADJUSTMENT

(75) Inventors: Min Zheng, Milpitas, CA (US); Min Li, Dublin, CA (US); Chen-Jung Chien, Sunnyvale, CA (US); Kowang Liu, Fremont, CA (US); Sung Chung, Campbell, CA (US)

(73) Assignee: Headway Technologies, Inc., Milpitas, CA (US)

( * ) Notice: Subject to any disclaimer, the term of this patent is extended or adjusted under 35 U.S.C. 154(b) by 714 days.

(21) Appl. No.: 12/215,825

(22) Filed: Jun. 30, 2008

(65) Prior Publication Data

US 2009/0323227 A1      Dec. 31, 2009

(51) Int. Cl.
*G11B 5/147* (2006.01)
(52) U.S. Cl. .................................. 360/234.4
(58) Field of Classification Search ............. 360/234.4
See application file for complete search history.

(56) References Cited

U.S. PATENT DOCUMENTS

| | | | |
|---|---|---|---|
| 7,239,481 B2 | 7/2007 | Lille et al. | |
| 7,349,170 B1 | 3/2008 | Rudman et al. | |
| 7,595,960 B2 * | 9/2009 | Shimizu et al. | 360/234.5 |
| 7,643,247 B2 * | 1/2010 | Sano et al. | 360/128 |
| 7,649,714 B2 * | 1/2010 | Kato et al. | 360/234.4 |
| 7,729,086 B1 * | 6/2010 | Song et al. | 360/125.31 |
| 7,898,767 B2 * | 3/2011 | Yamanaka et al. | 360/125.31 |
| 2002/0024774 A1 | 2/2002 | Berger et al. | |
| 2003/0035237 A1 * | 2/2003 | Lille | 360/77.07 |
| 2006/0034013 A1 * | 2/2006 | Kato et al. | 360/128 |
| 2006/0291098 A1 * | 12/2006 | Ota et al. | 360/128 |
| 2007/0230021 A1 | 10/2007 | Schreck et al. | |
| 2008/0088979 A1 * | 4/2008 | Nakata | 360/313 |
| 2008/0291579 A1 * | 11/2008 | Uesugi et al. | 360/314 |
| 2010/0091401 A1 * | 4/2010 | Ohwe | 360/75 |

OTHER PUBLICATIONS

Co-pending U.S. Appl. No. 12/080,276, filed Apr. 2, 2008, "Vertically Stacked DFH Heater Design for Protrusion Shape Control."

* cited by examiner

*Primary Examiner* — Mark Blouin
(74) *Attorney, Agent, or Firm* — Saile Ackerman LLC; Stephen B. Ackerman

(57) ABSTRACT

A dynamic fly heater (DFH) for improved lifetime and better film uniformity is disclosed for a magnetic head. The heater has a lower amorphous Ta layer and an upper W layer to promote small grain size and reduced electro-migration. The composite film is especially advantageous for heaters greater than 1000 Angstroms thick where dR/R is difficult to control in the prior art. The DFH may be a $(Ta/W)_n$ laminate in which the Ta layers are about 30 Angstroms thick and the combined thickness of the W layers is from 400 to 1200 Angstroms. A Ta film is preferably sputter deposited with an Ar pressure of 3 to 5 mTorr and the W film is sputter deposited in the same chamber with a 3 to 20 mTorr Ar pressure. In one embodiment, a merged read/write head has one DFH in the read head and a second DFH in the write head.

20 Claims, 3 Drawing Sheets

TA/W FILM AS HEATING DEVICE FOR DYNAMIC FLY HEIGHT ADJUSTMENT

RELATED PATENT APPLICATION

This application is related to the following: Ser. No. 12/080276, filing date Apr. 2, 2008; assigned to a common assignee, and herein incorporated by reference in its entirety.

FIELD OF THE INVENTION

The invention relates to a magnetic head and in particular, to an improved composition for a heating element that controls dynamic fly height between a read head or write head and a magnetic medium.

BACKGROUND OF THE INVENTION

Perpendicular magnetic recording (PMR) has become the mainstream technology for disk drive applications beyond 200 Gbit/in$^2$, replacing longitudinal magnetic recording (LMR) devices. The demand for improved performance drives the need for a higher areal density which in turn calls for a continuous reduction in transducer size. A PMR head which combines the features of a single pole writer and a double layered media (magnetic disk) has a great advantage over LMR in providing higher write field, better read back signal, and potentially much higher areal density. Typically, a dual purpose transducer is preferred in which the write head (PMR function) is combined with a read head function in the same structure to form a merged read/write head. The read head may be comprised of a sensor that is a TMR element in which a tunnel barrier layer separates two ferromagnetic (FM) layers where a first FM layer has a fixed magnetization direction and the second FM layer has a magnetic moment that is free to rotate from a direction parallel to that of the "fixed" layer to a direction anti-parallel to the fixed layer and thereby establish two different magnetic states generally referred to as a "0" state and a "1" state. The read process determines which of the two states the TMR element has been written to.

It is well known that the magnetic storage density increases as the gap (flying or fly height) between the magnetic media and a magnetic head such as a merged read/write head decreases. In other words, the so-called air bearing surface (ABS) or exposed plane of the merged read/write head that includes the write pole tip is brought closer to the magnetic media to enhance performance. However, due to non-uniformity in production, the fly height may vary from one slider to the next. Therefore, a low fly height may easily cause one or both of the read head and write head to contact the magnetic media which leads to poor reliability and a damaged device. On the other hand, if the flying height is too high, then poor magnetic performance may result that leads to increased bit error rate, slower read and write operations, and thus a decrease in storage density. Fly height is also influenced by the heat generated when a current is applied to the coils in a write head which tends to cause a thermal expansion of the read/write head toward the magnetic media.

For more controlled heating, at least one heater element is included in a merged read/write head to make adjustments in fly height in response to changes in environmental conditions such as temperature and pressure. A popular design used to control fly height is to position a dynamic fly heater (DFH) opposite the read head or opposite the main pole layer in the write head with respect to the ABS. When the heater is activated, thermal expansion of nearby layers including the write pole in the write head effectively pushes the write pole tip closer to the magnetic media. Likewise, heating of layers in the vicinity of the sensor in the read head causes thermal expansion which results in a read head protrusion toward the magnetic media and thereby reduces the fly height. As disclosed in related application Ser. No. 12/080276, a first dynamic fly heater (DFH) may be included proximate to the sensor in a read head and a second DFH may be positioned proximate to the write pole in a write head for improved fly height control to shorten actuation time and lower power consumption.

Gamma ratio is a critical parameter used to characterize a read/write head because it describes the relationship of mechanical minfly point to magnetic spacing. A lower gamma ratio means a larger gap between the mechanical minfly point and the reader location. An important head design objective is to achieve a gamma as close as possible to 1 which is ideal for tribology and magnetic performance since it keeps the gap between reader and minfly point at a constant value independent of DFH power (actuation). From a drive reliability point, the reader should not be at the minfly point which is the mechanically closet part of the head to the disk because the read head sensor is too sensitive towards mechanical impact. Ideally, the read head should be recessed from the minfly point by at least 0.5 nm.

Under certain conditions, a thin DFH made of a layer having a thickness of about 1000 Angstroms or less, provides a reasonable and predictable dR/R (change in resistance/initial resistance value) when stressed with an elevated current density and increased ambient temperature. However, when DFH thickness is increased to greater than 1000 Angstroms in order to adjust resistance upward, a faster dR increase is observed even at milder stressing conditions. This result indicates a greatly reduced dynamic fly heater lifetime that may be attributed to excessive electro-migration. Thus, a DFH composition is needed that has improved electro-migration behavior which leads to better reliability for thicker heating element films. In addition to reduced electro-migration, a smaller deviation of sheet resistance is needed to provide a tighter power usage distribution. Therefore, an improved DFH composition is required to address both reliability and performance demands in state of the art magnetic heads.

In U.S. Pat. No. 7,239,481, a heating device is disclosed that has a lower Ta adhesion layer formed on an insulation layer in a magnetic head and a heating element layer comprised of NiCr, CrV, or NiFe on the adhesion layer.

U.S. Patent Application 2006/0034013 describes a barrier of W or Ti on a heater wire and a temperature gradient relaxing material formed between turns in the heater element but does not specify the composition of the heater element itself.

U.S. Patent Application 2002/0024774 describes a heater made of an electrical resistance material but does not reveal the composition of the heater material.

In U.S. Patent Application 2007/0230021, NiFe, CuNi, CuSn, or CuMn are employed in a heater film to control flying height in a magnetic head.

U.S. Pat. No. 7,349,170 describes a heater used to control flying height in a magnetic head structure but does not specify a heater composition.

SUMMARY OF THE INVENTION

One objective of the present invention is to identify a DFH heater composition and method for forming the same that provides improved electro-migration (EM) behavior which leads to a longer heater lifetime.

Another objective of the present invention is to provide a DFH heater composition that affords improved film uniformity and a smaller standard deviation of heater resistance for tighter power usage distribution.

According to one embodiment of the present invention, these objectives are achieved by providing a read head or a write head on a substrate in which the read head or write head includes a heater to control fly height between the read head or write head and a magnetic medium. The heater is preferably formed within an insulation layer and may be positioned between the ABS and the back end of the device which is the side of the read head or write head opposite the ABS. Preferably, the heater is comprised of a lower amorphous layer such as Ta or TaN and an upper W conductive layer, and is formed a certain distance from the ABS such that the heater is not exposed to the air gap between the magnetic head and the medium.

In another embodiment, the aforementioned objectives are realized by providing a merged read/write head on a substrate in which at least one dynamic fly heater (DFH) is used to control fly height between the read/write head and a magnetic medium. In an embodiment where a single DFH is employed, the DFH may be formed proximate to the sensor in the read head or proximate to the write pole tip in the write head, or may be positioned in an insulation layer at a location between the ABS and the back end of the magnetic head. The DFH is essentially a resistor that is connected by leads to a power source such as a preamplifier or a PCB board and may be a planar layer of conductive material that is about 400 to 1200 Angstroms thick and with a length and width of 10 to 30 microns in a plane that is perpendicular to the ABS. In one embodiment, the DFH forms a meander pattern and has two ends that are connected to electrical leads. In another embodiment, the DFH may have a straight line shape or a rounded coil shape.

In an embodiment where more than one DFH is employed, there may be a first DFH formed on or within an insulation layer that is proximate to a sensor in the read head and a second DFH on or within an insulation layer proximate to the main pole layer in the write head. This configuration allows for a short rise time for reader actuation which leads to a fast response and low power consumption. Likewise, the close proximity of the second heater to the write pole tip enables fast writer actuation and low power consumption. The decoupling of reader protrusion and writer protrusion can be accomplished by simply changing the resistance ratio between the two heaters. Resistance in the heaters may also be changed by varying the heater thickness, changing the shape of the heater, or changing the composition of the heater.

A key feature of the present invention is that at least one DFH in the aforementioned embodiments has a composite structure in which an amorphous layer such as Ta is formed on an insulation layer and a conductive metal layer preferably made of W is disposed on the amorphous Ta layer. The amorphous Ta layer functions as a seed layer to control W film growth. The amorphous layer may be deposited in a physical vapor deposition (PVD) chamber or in a DC magnetron sputtering chamber with a process that involves Ar gas with a pressure between 3 to 10 mTorr, and preferably 3 mTorr. In the following step under the same vacuum and in the same deposition chamber, a W layer with a thickness from about 400 to 1200 Angstroms is deposited on the Ta layer with an Ar pressure of 3 to 20 mTorr, and preferably 12 mTorr. As a result, a W layer having a small grain size is formed that minimizes electro-migration in the magnetic head.

In an alternative embodiment, the at least one DFH is comprised of a laminate represented by $(Ta/W)_n$ where n is an integer greater than 1. The Ta layers may be between 20 and 40 Angstroms thick and the W layers preferably have a combined thickness less than about 1200 Angstroms. The DFH layers may be patterned to form various heater shapes by using standard photolithography and reactive ion etching processes.

DETAILED DESCRIPTION OF THE INVENTION

The preferred embodiments of the invention are now described with respect to the drawings in which at least one dynamic fly heater (DFH) hereafter referred to as "DFH" or "heater" is formed in a magnetic head. The exemplary embodiment describes the incorporation of at least one heater in a merged read/write head. Although the writer portion of the merged head design described herein is preferably a perpendicular magnetic recording element, the present invention is not bound by any particular write head or read head configurations and encompasses a variety of structural designs as appreciated by those skilled in the art.

According to one aspect of the present invention, the magnetic head may be a read head, a write head, or a merged read/write head. Furthermore, there may be only one heater having a novel composition disclosed herein that is formed within the magnetic head. The heater is preferably formed within an insulation layer between the ABS and the back end of the magnetic head and may be recessed a distance ranging from about 2 microns to 20 microns from the ABS. The thickness and shape of the heater may be varied to afford a desired resistance value. For example, the heater may be a wire that has a serpentine shape, a straight line shape, or a coil shape and is typically attached to two leads for electrical input and output.

Figure 1:
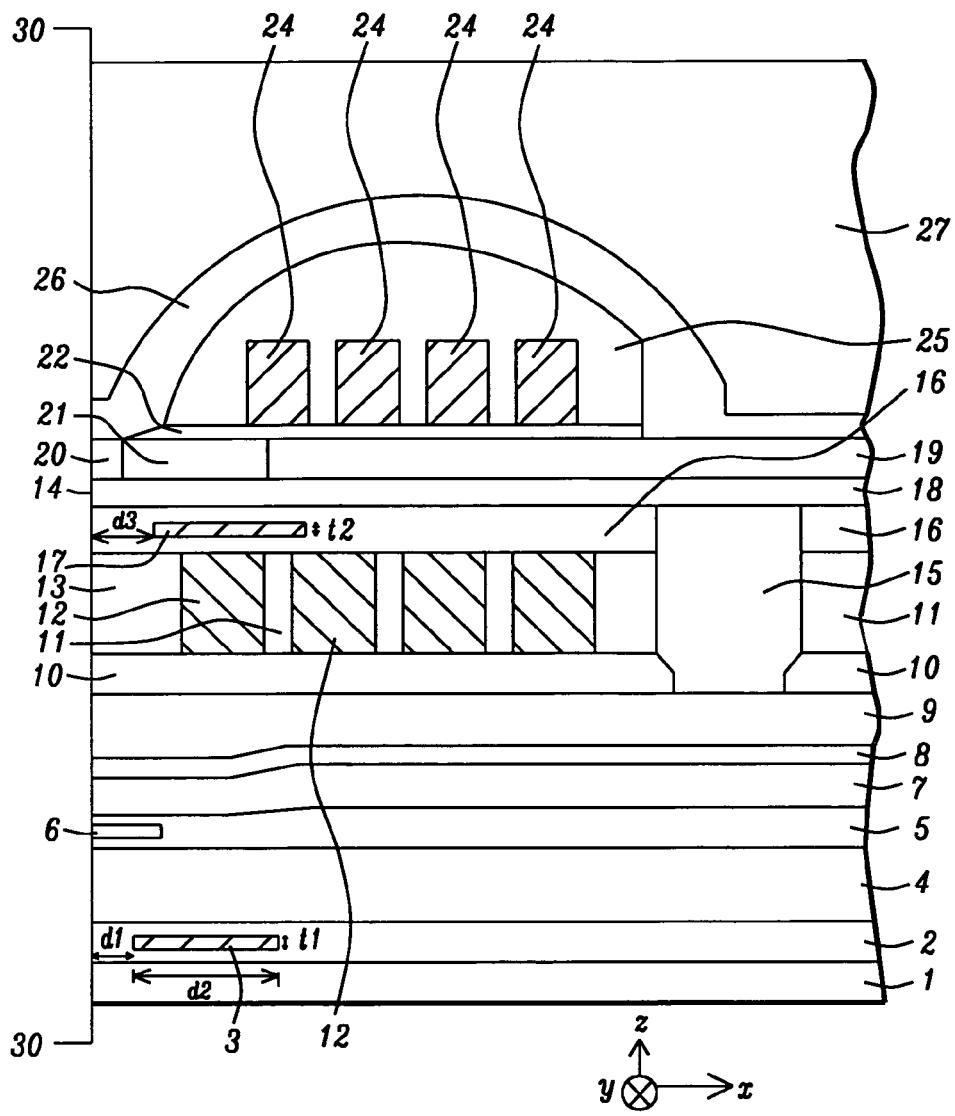
FIG. 1 is a cross-sectional view of a merged read-write head having a first heater element formed proximate to a sensor in the read head and a second heater element formed proximate to the main pole layer in the write head according to one embodiment of the present invention.

Referring to FIG. 1, one embodiment of a merged read/write head according to the present invention is depicted in a cross-sectional view from a plane orthogonal to an air bearing surface (ABS) 30-30 and was previously disclosed in related Headway application Ser. No. 12/080276. The merged read/ write head is formed on a substrate 1 which represents a slider body and is typically comprised of AlTiC (alumina+TiC). An insulation layer 2 is disposed on the AlTiC substrate 1 and may be made of a dielectric material such as alumina. Above the insulation layer 2 is a bottom shield 4 that may be comprised of NiFe, for example. A gap layer 5 is disposed on the bottom shield and is generally comprised of bottom and top insulating layers (not shown). A magnetoresistive element or sensor 6 is formed in the gap layer 5 along the ABS 30-30 and typically includes a plurality of layers (not shown) in which two ferromagnetic layers are separated by a non-magnetic layer to establish a "0" or "1" magnetic state, depending on whether the two ferromagnetic layers are magnetically aligned in the same direction or in an anti-parallel fashion. The non-magnetic layer may be Cu as in a giant magnetoresistive (GMR) sensor or may be comprised of an insulator such as alumina or MgO in a tunneling magnetoresistive (TMR) sensor.

A first top shield layer 7, insulation layer 8, and second top shield layer 9 are formed sequentially on the gap layer 5. Top shield layers 7, 9 may be made of the same magnetic material as in the bottom shield 4 and insulation layer 8 may be the same dielectric material as in insulation layer 2. Those skilled in the art will recognize that layers 2-8 represent the read head portion of the merged read/write head and layers 9-27 represent the write head portion. In one embodiment, a heater 3 may be included in the read head and will be described in a later section.

There is a first section of an insulation layer 10 formed on the second top shield layer 9 and between the ABS 30-30 and a back gap connection 15. Note that the insulation layer 10 has a second section that adjoins the back gap connection along a side opposite the first section. A bucking coil layer 12 may be disposed on the first section of insulation layer 10 and in the exemplary embodiment is shown with four turns that are separated from each other by an insulation layer 11 comprised of a photoresist material. The portion of bucking coil layer 12 closest to the ABS 30-30 is coplanar with an insulation layer 13 that is formed along the ABS. The top surfaces of insulation layers 11, 13 and bucking coil layer 12 are coplanar in this embodiment. Insulation layers 10, 11, 13 are comprised of a dielectric layer and bucking coil layer is typically a conductive material such as Cu. The back gap connection 15 may be made of CoFeNi or the like and magnetically couples the main pole layer 18 to the second top shield 9 that serves as a flux return pole.

An insulation layer 16 is formed on insulation layers 11, 13 and on bucking coil layer 12 and a first section extends from the ABS 30-30 to the back gap connection 15. Both of the insulation layers 11, 16 have a second section on the opposite side of the back gap connection 15 with respect to the ABS. Above the insulation layer 16 is a main pole layer 18 that may be comprised of CoFeNi or another magnetic material. Main pole layer 18 has a pole tip 14 at the ABS 30-30 and extends toward the back end of the device with a sufficient length to connect with back gap connection 15. A first write shield layer 20 is disposed on the main pole layer 18 at the ABS and extends a throat height distance (not shown) away from the ABS 30-30 to connect with a non-magnetic layer 21. The first write shield layer 20 may be made of CoFeN, CoFeNi, NiFe, or CoFe, for example, and is coplanar with the non-magnetic layer 21 and a yoke 19 which is formed on the main pole layer 18 and serves to concentrate magnetic flux at the write pole tip 14. There is an insulation layer 22 formed on a portion of the non-magnetic layer 21 and yoke 19. Magnetic flux in the yoke 19 is generated by passing a current through the main coil layer 24 that is disposed on the insulation layer 22. The main coil layer 24 has a plurality of turns but only four turns are depicted in the drawing.

There is a second shield layer 26 formed on the first shield layer 21 along the ABS and which arches over the main coil layer 24 and connects with the top surface of the yoke 19 in a region overlying the back gap connection 15. An insulation layer 25 is formed on the insulation layer 22 and fills the openings between the turns of the main coil layer 24 and the space between the main coil layer and the arched second shield layer 26. A protection layer 27 covers the second shield layer 26 and is made of an insulating material such as alumina. It should be understood that during a read or write operation, there is a magnetic recording disk having a top surface that forms a plane parallel to the ABS 30-30 and which is separated from the ABS by about 8 nm.

A key feature of the present invention is that one or more heaters of a composition disclosed herein may be formed in a magnetic head such as the merged read/write head in FIG. 1 to provide improved device reliability and a tighter standard deviation of resistance for tighter power usage distribution. In the exemplary embodiment, there is a first heater 3 formed in insulation layer 2 proximate to the sensor 6 in the read head and there is a second heater 17 formed in insulation layer 16 proximate to the write pole tip 14 and main pole layer 18. This configuration allows improved control in the read gap spacing during a write operation. In another embodiment, there may be only one heater formed in the read/write head to control dynamic fly height. In yet another embodiment, there may be a plurality of heaters formed within the merged read/write head.

It should be understood that in typical merged read/write heads having only one DFH heater, the higher thermal expansion of certain materials in the write head generally results in the write gap protrusion being larger than the read gap protrusion. As a result, the reader/writer protrusion ratio also known as the gamma ratio is generally much less than 1 which diminishes read head sensitivity. From a drive reliability point, the reader (sensor) should not be at the minfly point because the reader is too sensitive towards mechanical impact. Ideally, the sensor should be recessed by at least 0.5 nm from the minfly point. This condition should be independent of ambient temperature and heater actuation and only a gamma value of 1 can accommodate this requirement. For gamma <1, the mechanical spacing to disk reduces more than the magnetic spacing for the reader, and the opposite is true for a gamma >1.

As described in related patent application Ser. No. 12/080276, placement of the heaters 3, 17 may be optimized so that a gamma of approximately 1 can be realized and the time constant of reader actuation matches with the reading physics while the time constant of writer actuation matches with the perpendicular writing physics.

The inventors have previously practiced a method of fabricating a magnetic head whereby a W film is deposited and patterned to form a heater which controls head flying height over a medium. For a heater comprised of a 600 Angstrom thick W film, reasonable and predictable dR/R (change in resistance/initial resistance value) is achieved under stressed conditions of elevated current density and increased ambient temperature as will be described in a later section with reference to FIG. 5. However, when the thickness of a W heater is increased to 1100 Angstroms in order to adjust resistance as required for certain applications, a faster dR increase is observed even at milder stressing conditions. This result indicates a greatly reduced dynamic fly heater lifetime that may be attributed to excessive electro-migration. Thus, there is motivation to improve the heater composition to accommodate thicker heater films for satisfying resistance requirements without compromising performance in terms of reliability.

We have surprisingly found that when a heater has a composition comprising a lower amorphous layer such as Ta and an upper conductive metal layer such as W, a reduced EM is realized which leads to a longer heater lifetime and improved reliability. Optionally, the lower amorphous layer may be comprised of TaN or TaO. W is generally preferred over other conductive materials because of a lower propensity to electromigration.

Figure 2:
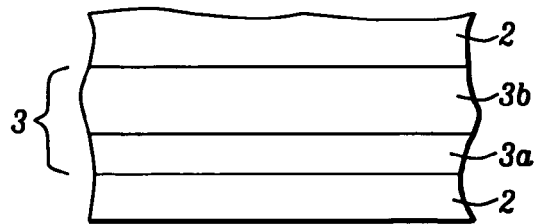
FIG. 2 is an enlarged cross-sectional view of a heater in FIG. 1 which has a lower amorphous layer and an upper W layer.

In the exemplary embodiment shown in FIG. 2, the first heater 3 is enlarged to show a lower amorphous layer 3a preferably made of Ta and having a thickness between 20 and 40 Angstroms, and more preferably 30 Angstroms. Upper conductive layer 3b is preferably comprised of W and has a thickness from 400 to 1200 Angstroms.

Figure 3:
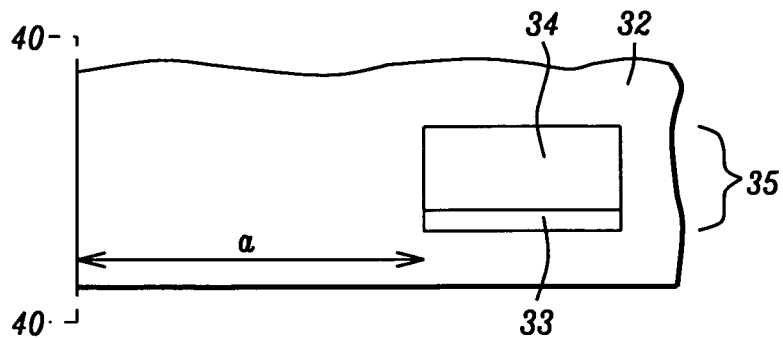
FIG. 3 is a cross-sectional view of a heater with a lower amorphous layer and an upper W layer formed within an insulation layer according to another embodiment of the present invention.

In an alternative embodiment shown in FIG. 3, a heater 35 in a magnetic head (not shown) may be formed within an insulation layer 32 and recessed a distance a of 2 to 20 microns from the ABS 40-40. Heater 35 is a composite with a lower amorphous layer 33 having a thickness between 20 and 40 Angstroms and comprised of Ta or TaN, and an upper conductive layer 34 with a thickness from 400 to 1200 Angstroms and preferably made of W. A Ta thickness below 20 Angstroms or greater than 40 Angstroms is not desirable because of poor full film uniformity. The preferred thickness range for the W conductive layer is generally designed to deliver the desired range of resistance values in existing devices.

Figure 4:
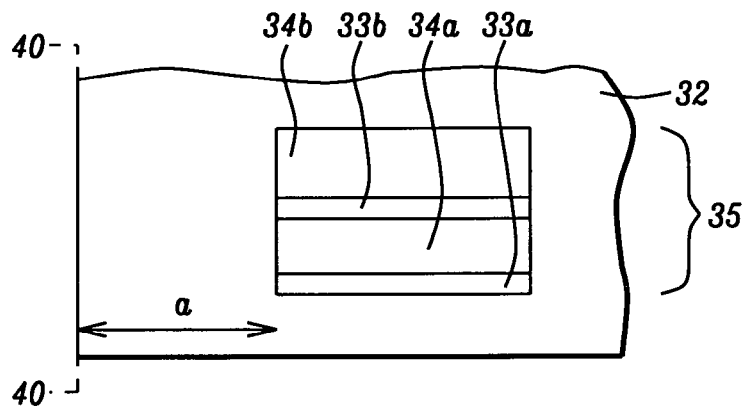
FIG. 4 is a cross-sectional view of a dynamic fly heater having a laminated structure and formed within an insulation layer according to an embodiment of the present invention.

Referring to FIG. 4, another embodiment is depicted wherein heater 35 has a laminated structure with alternating amorphous (A) layers and conductive (C) layers to give a $(A/C)_n$ configuration where n is an integer greater than 1. In the exemplary embodiment, heater 35 has a laminated structure where n=2. A first amorphous layer 33a is formed on insulation layer 32. Above first amorphous layer 33a is sequentially formed a first conductive layer 34a, a second amorphous layer 33b, and a second conductive layer 34b. Preferably, amorphous layers 33a, 33b may have a thickness from 20 to 40 Angstroms and are comprised of Ta or TaN, and the combined thickness of conductive metal layers 34a, 34b which are preferably W is from 400 to 1200 Angstroms. For example, each of layers 34a, 34b may be 600 Angstroms thick but preferably not greater than 600 Angstroms in order to keep the total thickness of the conductive layers 34a, 34b at 1200 Angstroms or below. Note that insulation layer 32 may be formed in a read head, write head, or in a merged read/write head. It should also be understood that a gap layer in a read head qualifies as an insulation layer.

A method of forming a heater in a magnetic head was previously described in related patent application Ser. No. 12/080276. Preferably, a sputter deposition system such as a DC magnetron thin film sputtering system which includes physical vapor deposition (PVD) chambers, an oxidation chamber, and a sputter etching chamber is used for depositing heater layers as well as other layers in the magnetic head. PVD chambers are also referred to as DC magnetron sputter chambers and are capable of co-sputtering more than one element to form an alloy. Typically, the sputter deposition process involves an argon sputter gas and the targets are made of metal or alloys to be deposited on a substrate. After the sputter deposition tool is pumped down to form a vacuum, the lower Ta layer is preferably deposited on a substrate such as an insulation layer, layer 2 for example, with process conditions comprising 3 to 10 mTorr Ar gas, and more preferably 3 mTorr Ar in a PVD chamber. Once the desired thickness of the lower Ta layer is achieved, the upper conductive layer which is preferably W may be deposited in the same vacuum and in the same chamber to improve throughput and avoid oxidation of the lower Ta layer. W deposition process conditions preferably comprise an Ar pressure of 3 to 20 mTorr, and more preferably 12 mTorr. It should be understood that 2 mTorr is practically the lowest stable pressure that can be achieved in the sputter deposition chamber so 3 mTorr represents a lower limit that does not challenge pressure stability and ensures a reproducible process. The deposited Ta/W film stack is patterned into a DFH by well known photolithographic and etch methods.

Referring again to FIG. 1, the first heater 3 may be formed in insulation layer 2 and is recessed from the ABS by a distance d1 of 2 to 20 microns. Insulation layer 2 may be about 1 micron thick and the thickness t1 of the first heater 3 is preferably 400 to 1200 Angstroms. A second heater 17 may be formed in insulation layer 16 and is recessed from the ABS 30-30 by a distance d3 of about 2 to 20 microns. The second heater 17 has a thickness t2 similar to t1. Both heaters 3, 17 have may have a length d2 along the x-axis direction of about 10 to 30 microns and a width (not shown) along the y-axis direction of about 10 to 30 microns.

Those skilled in the art will appreciate that the thickness and shape may be independently optimized for each heater 3, 17 to provide a desired resistance value. The protrusion of sensor 6 toward a magnetic recording disk is controlled by the resistance value of heater 3 and the amount of power applied to heater 3. Likewise, the protrusion of write pole tip 14 toward a magnetic recording disk during a write mode is controlled by the resistance value of heater 17 and the amount of power applied to heater 17. In one embodiment, heaters 3, 17 are connected in series (not shown) to a preamplifier or PCB board and thereby have a fixed resistance ratio determined by their respective shape, thickness, and composition.

The present invention encompasses other heater designs wherein a first DFH heater may be formed in a read head layer other than within insulation layer 2. For example, heater 3 may be formed in the gap layer 5 or in insulation layer 8. Likewise, the second DFH heater 17 may be formed in a write head layer other than insulation layer 16. In one alternative embodiment, the second heater 17 is formed in insulation layer 13. Note that the two heaters 3, 17 may not be recessed the same distance from the ABS. Three conditions may exist where the recess distance d1 for first heater 3 and the recess distance d3 for second heater 17 have the following relationships: d1>d3; d1<d3; and d1=d3.

The present invention also encompasses other heater designs that include more than two heaters. For instance, a third DFH heater (not shown) may be formed in the insulation layer 10 opposite the back gap connection 15 with respect to the ABS 30-30. Alternatively, a third DFH heater may be included in an insulation layer in the read head portion of the merged read/write head. The third DFH heater may be connected in series with the heaters 3, 17 or may be independently controlled by a preamplifier through a parallel connection. A third heater may be employed to redefine the actuation profile at the ABS.

The present invention also anticipates that a merged read/write head may be comprised of only one heater. For example, heater 3 may be omitted to leave only heater 17 in the magnetic head structure. Alternatively, a single heater 17 may be employed and may be positioned in a different location closer to sensor 6 such as in insulation layer 8 or in insulation layer 10. Those skilled in the art will appreciate that a single heater may be formed at other locations heretofore not mentioned in a merged read/write head and still provide advantages in the spirit of the present invention.

Figure 5:
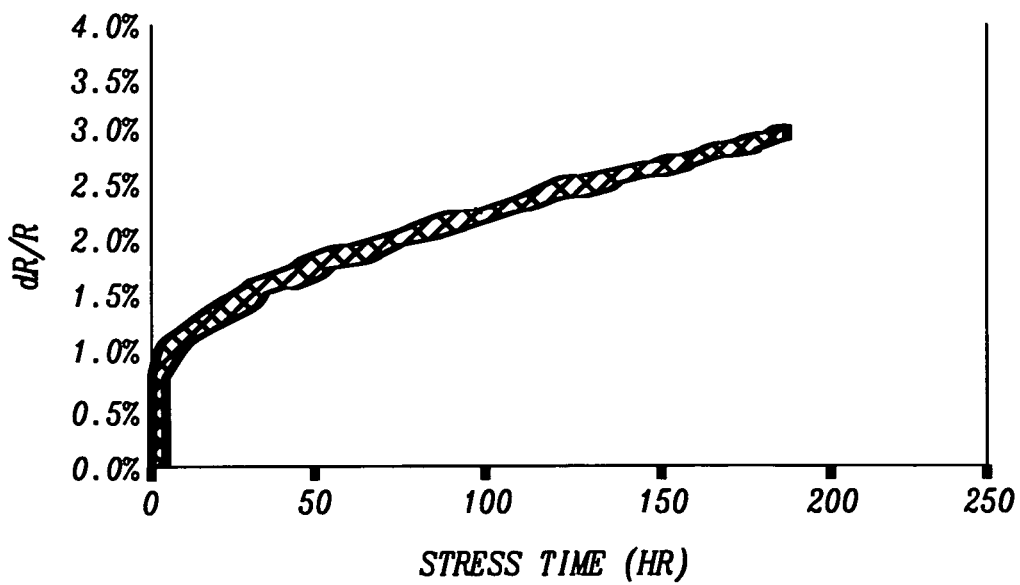
FIG. 5 is a graph showing the dR/R change at a required stressing condition for a heater comprised of a 600 Angstrom thick W film.
Figure 6:
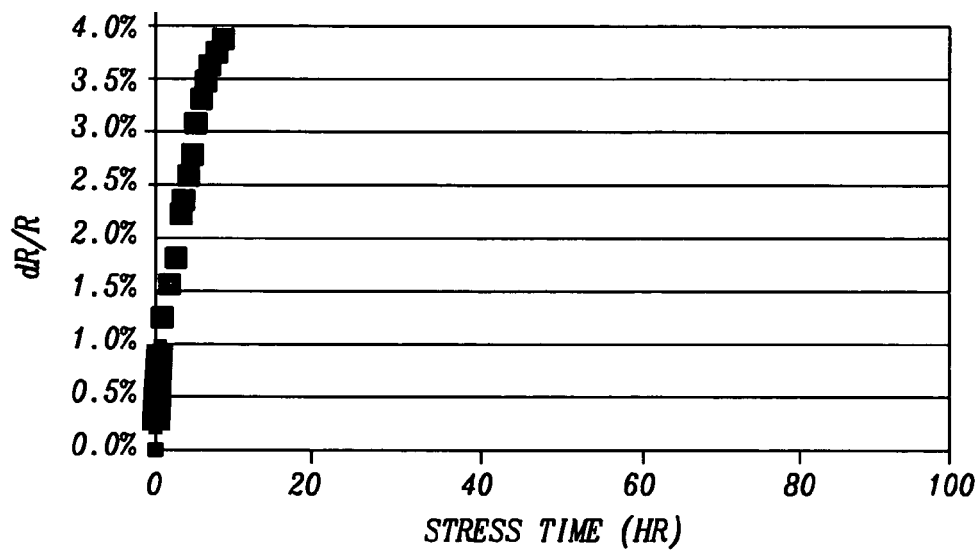
FIG. 6 is a graph showing the dR/R change at a mild stressing condition for a heater comprised of an 1100 Angstrom thick W film.
Figure 7:
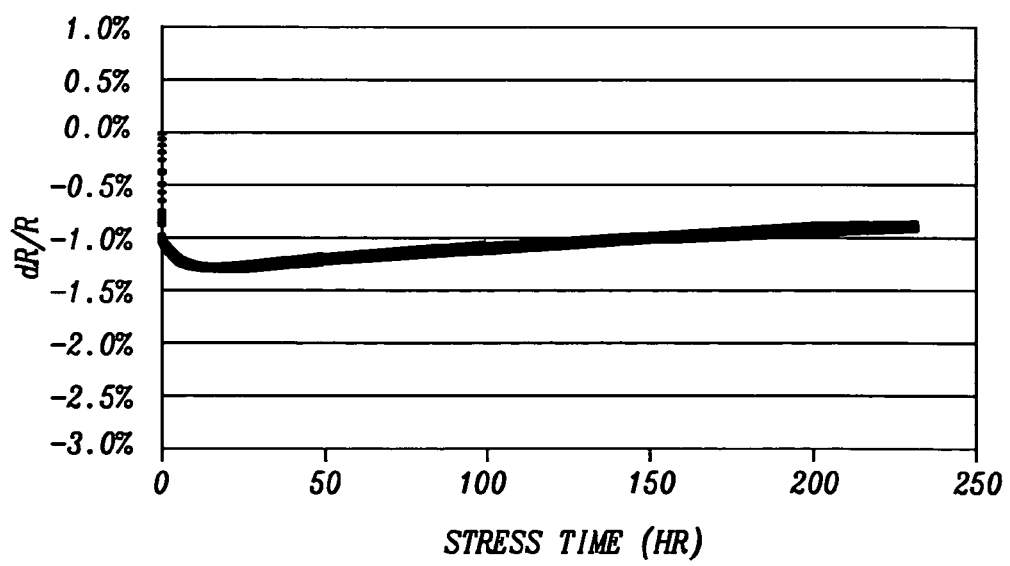
FIG. 7 is a graph showing a dR/R change at a required stressing condition for a dynamic fly heater having a 30 Angstrom thick lower Ta layer and a 1000 Angstrom thick upper W layer according to one embodiment of the present invention.

Referring to FIGS. 5-7, a magnetic head was fabricated with a heater comprised of different thicknesses and composition to demonstrate the advantages of a Ta/W DFH according to the present invention. Each heater was stressed under conditions consisting of an elevated temperature in the range of 100° C. to 180° C. and with 30 mA to 40 mA current (approx. 100 mW power) for 200 hours or more. The desirable heater should have a small and predictable DC resistance change under typical lifetime-stress test conditions. In other words, the change in dR/R should be small, preferably about 3% or less for many devices, during the 200 or more hours of stress testing.

With respect to FIG. 5, the effect of stressing a 600 Angstrom thick W heater film is illustrated as a plot of stress time in hours vs. dR/R. As expected, a reasonable and predictable dR/R change is found for this relatively thin film. After a fairly rapid increase to 1% dR/R during the first few hours, a steady and more gradual increase to about 3% occurs after approximately 200 hours. It is believed that electro-migration is a major contributor to the change in dR/R during a stress test.

With regard to FIG. 6, a stress test with a milder condition near the lower end of the time and current ranges indicated previously was performed for a heater comprised of an 1100 Angstrom thick W film. In this case, there is a sharp and continued rise in dR/R which approaches 4% after about 10 hours or less. Clearly, this prior art heater would not be acceptable in applications that require relatively thick films for higher resistance requirements. As mentioned previously, a rapid dR/R change corresponds to a greatly reduced heater lifetime.

In FIG. 7, the results are shown for an experiment with stress conditions similar to those applied with regard to FIG. 5 except the heater is comprised of a composite Ta/W film where the lower Ta layer is 30 Angstroms thick and the upper W layer is 1000 Angstroms thick. The heater is formed on or within an insulation layer comprised of $Al_2O_3$ or $SiO_2$, for example. After a small initial drop of around 1.5%, the dR/R essentially levels off at about −1% for over 200 hours. This result represents a significant improvement in heater lifetime because of a smaller dR/R change and a more gradual slope from the period of 50 hours to 200 hours. Thus, the composite heater film as defined herein yields the desired result of a smaller and more predictable resistance change than single film heaters of comparable thickness.

Another advantage of using a Ta/W heater film is the improved within wafer uniformity. For example, a pure 600 Angstrom thick W film affords a standard deviation of sheet resistance ($\sigma$) of around 2.5% which is reduced to a $\sigma$ of only 1.2% with a Ta/W film according to the present invention. Even though pre-amplifiers used in state of the art disk drives are mostly power driven to deliver the exact power wattage in the heater element, lower heater resistance variation is still desirable since the power usage distribution will also be tighter. It should be understood that there is a limited power source in a hard disk drive including a magnetic head, and the voltage available for operating the drives reduces with diminished drive form factors. The voltage supply in the pre-amplifier needs to support reading, writing, and DFH actuation. When the DFH resistance variation is large, the power budget for the DFH voltage requirement needs to be increased. With the DFH occupying an increased portion of the power budget, reading or writing power budget must be reduced accordingly which can negatively impact the drive performance. Therefore, a smaller $\sigma$ value for sheet resistance with a Ta/W heater as disclosed herein translates to a smaller power budget for the DFH voltage requirement and a positive influence on drive performance.

While this invention has been particularly shown and described with reference to, the preferred embodiment thereof, it will be understood by those skilled in the art that various changes in form and details may be made without departing from the spirit and scope of this invention.

We claim:

1. A magnetic head comprising at least one dynamic fly heater (DFH) wherein the at least one DFH is recessed a certain distance from an air bearing surface (ABS) and comprises:
   (a) a lower amorphous layer that consists of Ta, TaN, or TaO and is formed on a substrate; and
   (b) an upper conductive layer comprised of W.

2. The magnetic head of claim 1 wherein the lower amorphous layer is comprised of Ta and has a thickness between about 20 and 40 Angstroms.

3. The magnetic head of claim 1 wherein the lower amorphous layer is comprised of TaN and has a thickness from about 20 to 40 Angstroms.

4. The magnetic head of claim 1 wherein the magnetic head has a merged read/write configuration and the at least one DFH comprises one DFH formed in the read head and a second DFH formed in the write head.

5. The magnetic head of claim 1 wherein the at least one DFH is formed on or within an insulation layer.

6. The magnetic head of claim 1 wherein the W conductive layer has a thickness between about 400 and 1200 Angstroms.

7. A magnetic head comprising at least one dynamic fly heater (DFH) wherein the at least one DFH is recessed a certain distance from an air bearing surface (ABS) and comprises a plurality of amorphous (A) layers consisting of Ta, TaN, or TaO, and a plurality of W conductive layers formed on a substrate in a laminated $(AW)_n$ configuration where n is an integer greater than 1.

8. The magnetic head of claim 7 wherein each of the plurality of amorphous layers is comprised of Ta and has a thickness between about 20 and 40 Angstroms.

9. The magnetic head of claim 7 wherein each of the W conductive layers has a thickness and the sum of the thicknesses of "n" W layers is between about 400 and 1200 Angstroms.

10. The magnetic head of claim 7 wherein the magnetic head has a merged read/write head configuration and the at least one DFH comprises one DFH formed in the read head and a second DFH formed in the write head.

11. The magnetic head of claim 7 wherein the at least one DFH is formed on or within an insulation layer.

12. A method of forming a dynamic fly heater (DFH) in a magnetic head comprising:
   (a) forming a vacuum in a sputter deposition chamber;
   (b) sputter depositing an amorphous (A) layer consisting of Ta, TaN, or TaO on a substrate in said sputter deposition chamber; and
   (c) sputter depositing a W layer on said amorphous layer without breaking said vacuum in said sputter deposition chamber.

13. The method of claim 12 wherein the amorphous layer is has a thickness from about 20 to 40 Angstroms.

14. The method of claim 12 wherein the W layer has a thickness from about 400 to 1200 Angstroms.

15. The method of claim 12 wherein sputter depositing the amorphous layer comprises argon gas at a pressure between about 3 and 10 mTorr.

16. The method of claim 12 wherein sputter depositing the W layer comprises argon gas and a pressure between about 3 and 20 mTorr.

17. The method of claim 12 wherein the DFH is formed on or within an insulation layer.

18. The method of claim 12 further comprised of repeating steps (b) and (c) in succession a plurality of times to form a DFH stack having a $(A/W)_n$ configuration where n is an integer greater than 1.

19. The method of claim 18 wherein each of the A layers has a thickness between about 20 and 40 Angstroms.

20. The method of claim 18 wherein each of the "n" W layers has a thickness and the sum of the thicknesses of the W layers is between about 400 and 1200 Angstroms.

* * * * *